р

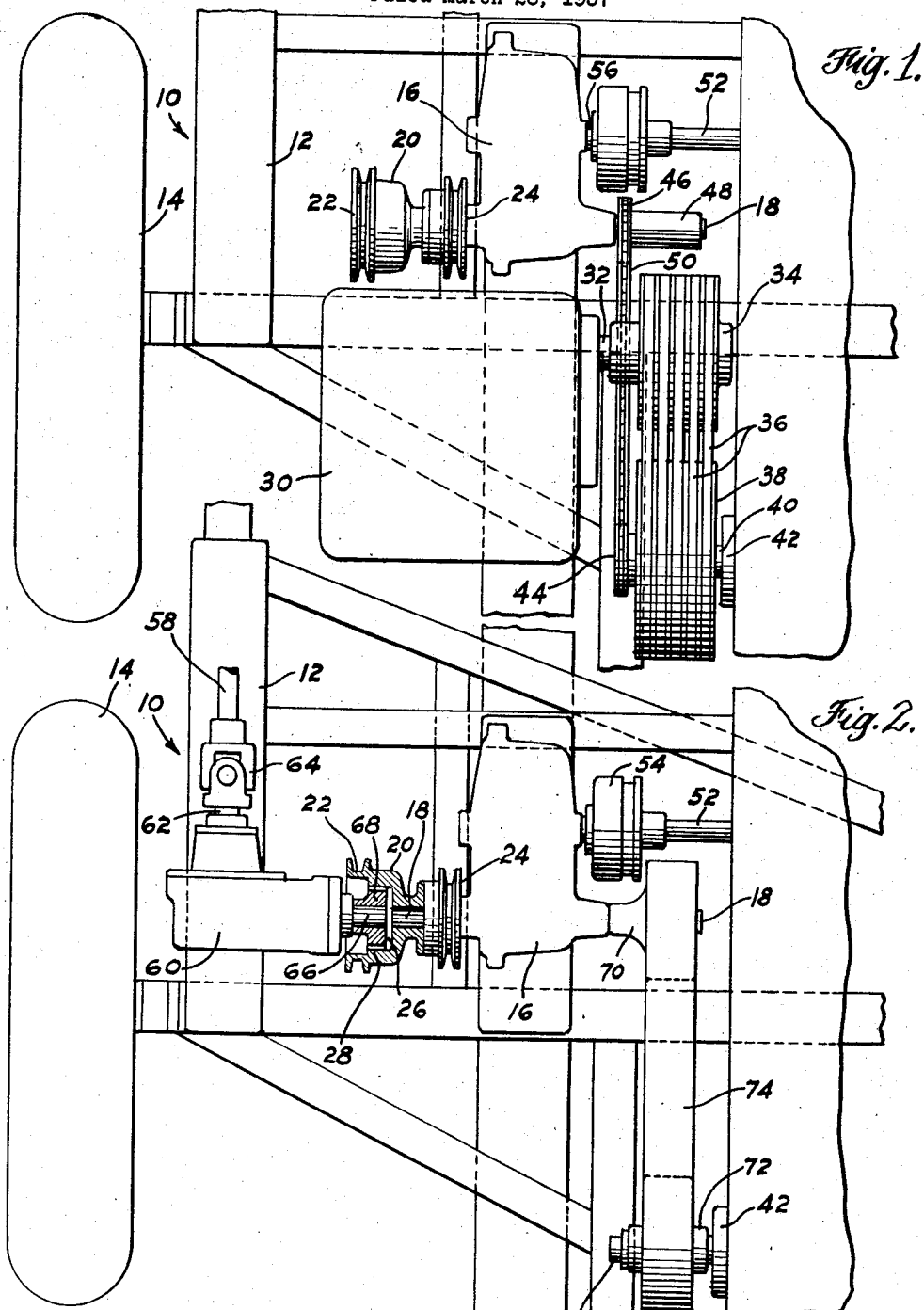

United States Patent Office 2,877,664
Patented Mar. 17, 1959

2,877,664

FORAGE HARVESTER DRIVE MEANS

James R. West, New Holland, Pa., assignor to Sperry Rand Corporation, New Holland, Pa., a corporation of Delaware Application March 28, 1957, Serial No. 649,231

5 Claims. (Cl. 74—665)

This invention relates to improvements in an agricultural forager and, more particularly, to drive means for agricultural foragers.

Agricultural foragers are used to harvest silage crops. Such crops may comprise grass, alfalfa, soy beans, sorghum, small grain crops, corn, or the like. It is necessary for the forager to be provided with cutter mechanism such as a sickle bar, conveying means to move the cut crop from the sickle bar to chopping cutter mechanism, and then move the chopped crops to a wagon or similar means connected to the rear end of the forager to carry the chopped silage to a silo, for example. Frequently, blower means are used to perform this last operation, the chopped silage being blown through a suitable conduit to the wagon.

Many agricultural implements of this nature rely upon the supporting wheels of the implement to provide the driving power for certain driven elements on the implement. However, when the implement has a sufficient number of driven elements which totally require a substantial amount of driving force, it has been found necessary to provide additional driving power to the implement. Accordingly, it is common practice at present to propel agricultural implements of various kinds by a tractor provided with a power take-off means such as a shaft, pulley, flexibly connected shafting, and the like. Thus, in addition to propelling an implement through a field, the tractor also furnishes driving power for certain driven elements on these implements.

In situations where a tractor is not provided with power take-off means, then agricultural implements propelled thereby which require additional power to drive certain elements thereon utilize an independent engine mounted directly upon the implement, the engine usually being of the internal combustion gasoline type.

Silage foragers or harvesters are one example of agricultural implement requiring a considerable amount of power to drive the various elements included thereon such as a sickle bar, row crop sickle bar mechanism, conveyor means, cutter or chopping head, and the like. Rather than rely in any way upon the supporting wheels of the forager to drive any of this mechanism, it is common practice to drive the mechanism selectively either by power take-off means from a tractor or an auxiliary gasoline engine carried directly by the forager.

Providing such selective driving means in foragers presents a problem to an agricultural implement distributor or supplier in that, at present, it is necessary for such distributor or supplier to maintain two types of each size of forager in stock. One of these types is arranged to be driven by the power take-off of a tractor, while the other is arranged to be driven by an auxiliary gasoline engine for example. This creates an inventory problem as well as a substantial investment on the part of the supplier or distributor.

The principal purpose of the present invention is to provide an agricultural forager capable of being adapted, with a minimum of transformation, either to be driven by a power take-off means on a tractor or an auxiliary gasoline engine which is mounted directly on the forager. A driven shaft on the forager which is used with either type of power drive means is utilized as a common means to be driven by either type of power drive in accordance with the principles of the invention.

Still another object of the invention is to so arrange a sheave unit which is connected to one end of said driven shaft so that said sheave may drive one of several types of sickle bar units by belts passing around the sheave, while said driven shaft also is connected to the cutter head of the forager so as to actuate it simultaneously with the sickle bar of the forager.

A further object of the invention is to provide said sheave with ready means by which it may be connected to the driven extremity of a power take-off unit of a tractor when the forager is to be driven thereby, or alternatively and selectively, an auxiliary gasoline engine may be mounted upon the forager and connected to the cutter head of the forager, said cutter head also being connected by flexible means such as a belt or chain to the driven shaft which carries the sheave, whereby said auxiliary engine may drive simultaneously all of the driven elements of the forager in lieu of the same being driven by the power take-off means of a tractor when the latter is used rather than the auxiliary engine.

Ancillary to the foregoing objects, the preferred embodiment of the invention comprises the forming of a socket in the outer end of the sheave which is complementary to the driven extremity of a power take-off unit, whereby driving relationship is established between said power take-off extremity and sheave simply by inserting said extremity axially into the socket of the sheave, yet when an auxiliary engine is used to drive the forager, the sheave serves its normal function of driving belts connected to the sickle bar arrangements on the forager while all driven members of the forager are powered by the auxiliary engine which is connected to the cutter head shaft.

Still another object of the invention is to provide conversion mechanism which is of very simple nature and is easily manipulated to transform the forager from a condition to be driven by a power take-off unit of a tractor or an auxiliary engine carried by the forager, all of the mechanism being easily and quickly transformed with a minimum consumption of time and by the use of simple tools, yet affording rugged and durable construction in all of the mechanism.

Details of the foregoing objects and of the invention, as well as other objects thereof, are set forth in the following specification and illustrated in the accompanying drawing comprising a part thereof.

In the drawing:

Fig. 1 is a top plan view of a fragmentary portion of an exemplary forager illustrated as being adapted to be driven by an auxiliary engine.

Fig. 2 is a similar view of the same forager converted and adapted to be driven by a power take-off unit connected to a tractor by which the forager is propelled through a field or otherwise.

The exemplary forager illustrated in Figs. 1 and 2 has only been shown fragmentarily inasmuch as the present invention primarily is concerned with the essential drive mechanism illustrated in these figures. In order to adapt the forager to harvest crops of different kinds, it is necessary to change the cutting mechanism, for example, of the forager to provide the same with the most suitable type of cutting mechanism for any particular crop. For example, a sickle bar is used to harvest certain relatively low crops such as grass, alfalfa, and the like, while different types of cutting mechanisms are required to harvest row crops or corn. However, the essential driving mechanism shown in these figures is used substantially with all types of adaptable cutting mechanisms which may be mounted upon the forager, whereby only such essential drive mechanism primarily is illustrated.

The forager 10 comprises a frame 12 which is of exemplary nature. The frame is supported by a pair of wheels 14, only one of which is shown in the figures, it being understood that one wheel is provided at each side of the forager frame 12. A gear shift transmission unit 16 is supported by the frame and is enclosed within a suitable casing or housing which rotatably supports a driven shaft 18, the opposite ends of which project from opposite sides of the housing 16.

A compound sheave 20 has a socket in one end which receives said projecting end of shaft 18 and is fixed thereto for rotation therewith. The compound sheave 20, in the preferred embodiment of the invention illustrated herein, comprises a sheave 22 which drives a belt connectable to one form of sickle bar which, for example, may extend across the entire front end of the forager, such sickle bar not being shown for purposes of simplifying the illustration. A second sheave 24 also is provided on the compound sheave 20, the sheave 24 being arranged to drive a belt which is connectable, for example, to a row crop sickle bar assembly, not illustrated, used to harvest row crops. The outer end of compound sheave 20, in accordance with the principles of the present invention, is formed with a socket 26 extending axially into said sheave from the outer end thereof, the peripheral wall of said socket comprising an internal gear 28.

When the forager is arranged to be driven by an auxiliary engine, such engine 30 is mounted upon the frame 12 and comprises a suitable type of prime mover such as an internal combustion gasoline engine of conventional type used for such driving purposes. Such engine is provided with a power shaft 32 having a multiple pulley 34 fixed thereto for purposes of accommodating a plurality of flexible belts 36 which also pass around another multiple pulley 38 which is fixed to one end of shaft 40 by which cutter head 42 is driven to operate the chopping mechanism of the forager.

Fixed to the outer end of shaft 40 or multiple pulley 38, as desired, is a sprocket gear 44. Another sprocket gear 46 is provided with hub 48 which is removably connectable to the other outer end of driven shaft 18. A flexible sprocket chain 50 extends around sprocket gears 44 and 46 to establish common driving relationship between the same.

The forager also is provided with a conveyor drive shaft 52 for purposes of driving the conveyor of the forager to move the cut crops from the sickle bars or other cutting means at the forward end of the forager to the chopping mechanism which includes cutter head 42. Shaft 52 is connected by any suitable means such as a slip clutch 54 to a shaft 56 comprising part of the gear shift transmission unit 16.

From Fig. 1, it will be seen that the auxiliary engine 30 carried by the frame of the forager drives multiple pulley 34 which, through belting 36, drives multiple pulley 38 and cutter head 42. The cutter head shaft 40 also drives sprocket gears 44 and 46, thereby driving the driven shaft 18 and the gear shift transmission unit 16 so as to rotate conveyor drive shaft 52 and also drive the compound sheave 20 by which the several types of sickle bar cutting means selectively may be driven.

Referring to Fig. 2, the forager illustrated in Fig. 1 has been converted to being driven by the outer extremity of a power take-off unit which extends from a tractor, not shown. A shaft 58, which may be either a power take-off shaft of a tractor per se, or flexibly connected thereto by suitable universal joint means, drives a power take-off gear box 60 detachably connected to the frame 12. The gear box 60 has a shaft 62 which is connected by universal joint 64 to power take-off shaft 58. Also projecting from gear box 60 is another driving shaft 66 to which a spur gear 68 is connected, said spur gear 68 being complementary to internal gear 28 of compound sheave 20.

In adapting the power take-off unit to the frame 12 it simply is necessary to connect the gear box 60 to the frame after moving the spur gear 68 axially into socket 26 of sheave 20 so as to mesh the teeth of the spur gear 68 with those of internal gear 28. Thus, driving relationship is established between the outer extremity of the power take-off unit of the tractor with driven shaft 18 of the forager.

The adaptation of the forager 10 to be driven by the power take-off unit of a tractor also requires a slight amount of additional adaptation such as the substitution of a pulley 70 for the sprocket gear 46 shown in Fig. 1, and the additional substitution of a pulley 72 for the multiple pulley 38 and sprocket gear 44 shown in Fig. 1. A belt 74 also preferably is used to driveably connect pulleys 70 and 72. It is to be understood however that these pulleys and the belt 74 primarily are exemplary to represent any suitable type of driving connection between driven shaft 18 and shaft 40 of cutter head 42. The illustrated pulleys and belts merely represent one convenient drive means of this type which is simple and inexpensive, yet effective to drive the cutter head.

From Fig. 2, it will be seen that when the forager 10 is adapted to be driven by the power take-off of a tractor, driven shaft 18 is actuated directly by the power take-off gear box shaft 66 through a simple but effective connection comprising spur gear 68 and internal gear 28, the latter being formed in sheave 20. It will be understood of course that the sheave 20 is the same in both arrangements of the drive mechanism of the forager. By means of driven shaft 18, the transmission unit 16 is powered so as to drive conveyor shaft 52 and also cutter head 42.

From the foregoing, it will be appreciated that the drive means of a forager of any particular size substantially may be standardized and only a very limited amount of adaptation is required to render the forager in condition to be driven selectively either by an auxiliary engine 30 or a power take-off extremity means such as spur gear 68. Essentially, only the substitution of sprocket gears 44 and 46 for pulleys 70 and 72, or vice versa, is required. No changing of the compound sheave 20 is necessary and the transmission unit 16 remains the same, it preferably being continually connected to conveyor shaft 52 regardless of which type of drive means is utilized. Under the circumstances, it merely is necessary for a supplier or distributor to maintain in stock a suitable supply of power take-off adaptor units essentially comprising gear box 60 and spur gear 68, an additional supply of sprocket gears 44 and 46, as well as pulleys 70 and 72 and the necessary sprocket chains 50 and belts 74. The supply of auxiliary engines 30 preferably would include the multiple pulleys 34 and 38 and the sets of belts 36 required by the same. An investment of additional inventory of this nature is far less than is required at present where it is necessary to maintain an inventory of foragers respectively equipped with mechanism to render the same connectable either to the power take-off of a tractor or having an auxiliary engine mounted thereon to drive the various elements of the forager. The principal feature of the present invention which makes it possible to readily convert a forager so as to be driven by one or the other of said power means comprises the unique design of the sheave 20 which permits ready connection thereto of power take-off mechanism, and also the alternative means for connecting the auxiliary engine 20 to the opposite end of driven shaft 18 of the transmission unit 16.

When the forager is driven by a power take-off unit, then the driven shaft 18 drives the cutter head shaft 40, while when the forager is converted so as to be driven by the auxiliary engine, the cutter head shaft 40 becomes a driven shaft which, in turn, drives the driven shaft 18, Under both circumstances, the sheave 20 performs its normal driving function relative to sickle bar mechanisms actuated by pulleys connected to said sheave.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. An agricultural forager comprising in combination, a frame, a driven assembly comprising a driven shaft rotatably supported by said frame, a cutter head on said frame having a rotatable cutter head shaft spaced from said driven shaft, flexible drive means interconnecting said shafts for the drive of one shaft by the other, and sheave means fixed to said driven shaft and operable to drive belt means connectable to other driven members on said forager, said sheave means being provided with connection means to receive and be connected to the driving extremity of a power take-off unit of a tractor attachable to said forager and said rotatable cutter head shaft having means connectable to an engine attachable to said forager, whereby said driven shaft and sheave and said cutter head shaft have means connectable selectively to a power take-off unit and engine to drive simultaneously said cutter head and sheave as well as the forager elements connected to said sheave.

2. The drive mechanism according to claim 1 further characterized by said connection means provided on said sheave comprising means thereon arranged to interfit quickly with complementary means on the driving extremity of said power take-off unit which prevent relative rotation therebetween.

3. An agricultural forager comprising in combination, a frame, a driven assembly comprising a driven shaft rotatably supported by said frame, a cutter head on said frame having a rotatable cutter head shaft spaced from said driven shaft, flexible drive means interconnecting said shafts for the drive of one shaft by the other, and sheave means fixed to one end of said driven shaft and operable to drive belt means connectable to other driven members on said forager, said sheave means being provided with a socket formed axially in the outer end thereof to receive and thereby be connected to the driving extremity of a power take-off unit of a tractor attachable to said forager and said rotatable cutter head shaft having means connectable to an engine attachable to said forager, whereby said driven shaft and sheave and said cutter head shaft have means connectable selectively to a power take-off unit and engine to drive simultaneously said cutter head and sheave as well as the forager elements connected to said sheave, said sheave socket having a geometric configuration complementary in cross-section to the power take-off extremity, whereby the same will be relatively non-rotatable but relatively axially movable.

4. The drive means according to claim 3 in which said socket comprises an internal gear.

5. An agricultural forager comprising in combination, a frame, a driven assembly comprising a driven shaft rotatably supported by said frame, a cutter head on said frame having a rotatable cutter head shaft spaced from said driven shaft, flexible drive means comprising pulley-like and belt-like means interconnecting said shafts for the drive of one shaft by the other, and sheave means fixed to said driven shaft and operable to drive belt means connectable to other driven members on said forager, said sheave means being provided with connection means to receive and be connected to the driving extremity of a power take-off unit of a tractor attachable to said forager and said rotatable cutter head shaft being adapted to have a pulley connected thereto and connectable by belt means to a pulley on an engine attachable to said forager, whereby said driven shaft and sheave and said cutter head shaft have means connectable selectively to a power take-off unit and engine, to drive simultaneously said cutter head and sheave as well as the forager elements connected to said sheave.

References Cited in the file of this patent

UNITED STATES PATENTS

| | | |
|---|---|---|
| 1,862,035 | Rainwater | June 7, 1932 |
| 1,887,789 | Rush | Nov. 15, 1932 |
| 2,352,854 | Miller | July 4, 1944 |
| 2,488,069 | Spalding | Nov. 15, 1949 |
| 2,725,704 | Skromme | Dec. 6, 1955 |
| 2,756,978 | Wachsmith | July 31, 1956 |